(12) United States Patent
Brandão et al.

(10) Patent No.: US 10,513,866 B2
(45) Date of Patent: Dec. 24, 2019

(54) WIND TURBINE TOWER AND RESPECTIVE FOUNDATION BASE

(71) Applicants: Metalvix Engenharia e Consultoria Ltda., Vitória (BR); MCA Tecnologia de Estruturas Ltda., Vitória (BR)

(72) Inventors: José Emílio Brandão, Vitória (BR); Carlos Alberto Pinto Montenegro, Vitória (BR); Carlos Augusto Calmon Nogueira da Gama, Vitória (BR)

(73) Assignees: MCA Tecnologia de Estruturas Ltda., Vitória, ES (BR); Metalvix Engenharia e Consultoria Ltda., Vitória, ES (BR)

( * ) Notice: Subject to any disclaimer, the term of this patent is extended or adjusted under 35 U.S.C. 154(b) by 0 days.

(21) Appl. No.: 16/048,017

(22) Filed: Jul. 27, 2018

(65) Prior Publication Data

US 2019/0338548 A1 Nov. 7, 2019

(30) Foreign Application Priority Data

May 2, 2018 (EP) .................................. 18155120.1

(51) Int. Cl.
*E04H 12/20* (2006.01)
*F03D 13/20* (2016.01)
(Continued)

(52) U.S. Cl.
CPC ............ *E04H 12/20* (2013.01); *E02D 27/42* (2013.01); *E02D 27/425* (2013.01); *E02D 27/50* (2013.01);
(Continued)

(58) Field of Classification Search
CPC ......... E04H 12/20; E04H 12/12; E04H 12/16; E04H 12/34; F03D 13/22; F03D 13/20;
(Continued)

(56) References Cited

U.S. PATENT DOCUMENTS

| 883,164 | A | * | 3/1908 | Benson | .................. | B65D 88/08 |
| | | | | | | 266/282 |
| 1,567,301 | A | * | 12/1925 | Ross | ....................... | E04H 12/12 |
| | | | | | | 232/39 |

(Continued)

*Primary Examiner* — Jessie T Fonseca
(74) *Attorney, Agent, or Firm* — Sheppard Mullin Richter & Hampton LLP (57) ABSTRACT

The present invention refers to a wind turbine tower and a respective foundation base, comprising a central column with a central column foundation, upper tensile structural elements with upper ends attached to a tensile structure element bearing portion of the central column and tensile structural element foundations around the central column foundation. The structural system is characterized in that each lower end of the upper tensile structural elements is attached to a respective compressive structural element that connects said lower end of the respective upper tensile structural element with a compressive structural element bearing portion of the central column and that each lower end of the upper tensile structural elements is attached to a respective lower tensile structural element that connects said lower end of the respective upper tensile structural element with one of the tensile structural element foundations.

19 Claims, 3 Drawing Sheets

(51) Int. Cl.
  *E04H 12/34* (2006.01)
  *E02D 27/42* (2006.01)
  *E04H 12/16* (2006.01)
  *E02D 27/50* (2006.01)
  *E04H 12/12* (2006.01)

(52) U.S. Cl.
  CPC .............. *E04H 12/12* (2013.01); *E04H 12/16* (2013.01); *E04H 12/34* (2013.01); *F03D 13/20* (2016.05); *F03D 13/22* (2016.05); *F05B 2240/221* (2013.01); *F05B 2240/912* (2013.01)

(58) Field of Classification Search
  CPC ......... F05B 2240/912; F05B 2240/221; E02D 27/42; E02D 27/425; E02D 27/50; Y02E 10/728
  See application file for complete search history.

(56) References Cited

U.S. PATENT DOCUMENTS

| | | | | |
|---|---|---|---|---|
| 1,678,500 | A * | 7/1928 | Ellis | E04H 12/12 362/431 |
| 1,777,509 | A * | 10/1930 | Underwood | E04H 12/12 362/431 |
| 1,798,982 | A * | 3/1931 | Ne Page | E04H 12/12 52/295 |
| 1,919,491 | A * | 7/1933 | Waggoner | E04H 12/12 52/649.4 |
| 3,501,881 | A * | 3/1970 | Ven Buren | B28B 23/043 52/223.4 |
| 3,552,073 | A * | 1/1971 | Millerbernd | E02D 27/42 248/158 |
| 4,166,347 | A * | 9/1979 | Pohlman | E04C 3/34 52/223.4 |
| 4,196,551 | A * | 4/1980 | Bondarenko | E04H 5/12 52/223.3 |
| 5,218,805 | A * | 6/1993 | Rex | E01F 8/0023 256/24 |
| 6,705,058 | B1 * | 3/2004 | Foust | E04C 3/32 52/296 |
| 7,059,096 | B2 * | 6/2006 | Kuebler | E04H 12/003 174/45 R |
| 2003/0000165 | A1 * | 1/2003 | Tadros | E04C 3/22 52/223.4 |
| 2004/0262926 | A1 * | 12/2004 | Hansen | B63B 25/002 290/44 |
| 2010/0150663 | A1 * | 6/2010 | Torres Martinez | E02B 17/0021 405/222 |
| 2011/0138704 | A1 * | 6/2011 | Bagepalli | E04H 12/12 52/147 |
| 2012/0017536 | A1 * | 1/2012 | Hager | B28B 7/0079 52/651.01 |
| 2012/0205133 | A1 * | 8/2012 | Jensen | E04H 12/12 174/2 |
| 2012/0311948 | A1 * | 12/2012 | Hangel | B66C 1/66 52/295 |
| 2013/0001954 | A1 * | 1/2013 | Garc A Maestre | F03D 13/22 290/55 |
| 2013/0205686 | A1 * | 8/2013 | Kawabata | E04H 12/16 52/98 |
| 2014/0250806 | A1 * | 9/2014 | Schibsbye | E02D 27/42 52/223.13 |
| 2015/0052836 | A1 * | 2/2015 | Kirkley | E04H 12/342 52/223.5 |
| 2016/0025074 | A1 * | 1/2016 | Sato | B63B 35/44 405/224 |
| 2016/0097199 | A1 * | 4/2016 | Saiidi | E01D 19/02 52/126.7 |
| 2016/0108600 | A1 * | 4/2016 | Menzel | E02D 27/42 52/223.13 |
| 2016/0201350 | A1 * | 7/2016 | Zavitz | E02D 27/425 52/223.5 |
| 2016/0201653 | A1 * | 7/2016 | Holscher | E02D 27/425 405/252 |
| 2017/0051717 | A1 * | 2/2017 | Kim | B01D 3/346 |
| 2017/0152641 | A1 * | 6/2017 | Serna Garc A-Conde | E04H 12/2269 |
| 2018/0266069 | A1 * | 9/2018 | Betzer | E02D 27/18 |

* cited by examiner

WIND TURBINE TOWER AND RESPECTIVE FOUNDATION BASE

CROSS-REFERENCE TO RELATED APPLICATIONS

This application claims the benefit under 35 U.S.C. § 119 of European Patent Application 18155120.1 filed on Feb. 5, 2018, the content of which is hereby incorporated by reference in its entirety.

FIELD OF THE INVENTION

The present invention refers to a wind turbine tower and the respective foundation base, capable of withstanding high loads from the operation effects of the wind turbine (particularly in horizontal direction) and the wind itself on the tower.

BACKGROUND OF THE INVENTION

The use of towers for horizontal axis wind turbines is not recent, and its development has been boosted since the decade of 1980. For this type of wind turbine, the best use of the energy contained in the wind occurs with towers of greater height, since the wind is generally stronger and less turbulent under these conditions. The evolution of wind power generation technology has also brought greater dimensions to the components of known systems such as the rotor, tower and foundation. Towers that support wind turbines with a power of several megawatts currently have currently heights from 80 to 120 meters and above, and their structures are made of steel (tubular or trussed) or concrete (reinforced and/or prestressed). Also, exclusively tubular steel towers with heights exceeding 100 m and turbine outputs>2.0 MW are practically ruled out because of the transport width of the base segments (larger than 4.30 m in diameter). Therefore, for high towers (reaching 130 m hub height for a 5 MW wind turbine), the most economical solution presently is a hybrid tower design, consisting of a prestressed concrete tower (up to h=120 m) and a tubular steel top segment that supports the nacelle with the rotor.

Their bases are built with direct or indirect foundations made of concrete with large dimensions. Although the present concrete foundations meet the functions for which they are intended, with different types of format (square, polygonal, circular and annular), they account for big dimensions and a large volume of concrete and weight of reinforcement steel bars, due to the high moments transferred from the tower to the foundation base, at the around 280 cubic meters for towers of 80 meters height with turbines with a turbine having a nominal power of approximately 1.5 megawatts (passive reinforcement weighing about 17 tons), up to 1500 cubic meters for towers of 100 meters height with a turbine having a nominal power of around 5 megawatts (passive reinforcement weighing about 130 tons).

The large dimensions of wind farms and the large number of wind turbines, that have to be spaced apart by a minimum of the longitudinal extend of the tower and a distance three times the diameter of the rotor, are two of the most significant cost drivers during construction and operation of wind farms. Given these technical characteristics, bases for support existing wind turbine towers account for high costs of production, assembly, transportation and construction of wind turbine towers.

The foundation bases of the current wind turbine towers cause some inconveniences in the installation processes, such as:
large volume of excavation and backfilling due to the current dimensions of the foundation;
cost of reinforcement, material and labor;
longer production, transportation and execution time;
large volume of concrete required (may require refrigeration to combat thermal cracking);
large quantities of piles, when the geotechnical conditions of the site soil require deep foundations All the above-mentioned items have significant impact in the wind park implementation costs (in the range of 20-30%), then many efforts and initiatives has been made by the wind park developers to minimize these costs. This is the main driver of the invention subjected to this process and described as follows.

Structural Principle of Flexural Rigidity

One approach to minimize the mentioned drawbacks is to scale down actual center columns of wind turbine towers regarding flexural rigidity and to envisage reinforcement structures in form of anchoring wires for compensating said lack of flexural rigidity. A wind turbine tower of such kind is exemplarily described in document DE 103 09 825 A1.

However, the disadvantage of wind towers with reinforcement structures according to the state of the art is that said reinforcement structures with anchoring wires support respective center columns only at single heights. Such reinforcement structures are not capable to prevent bending at several heights of the central columns.

Therefore, the object of the present invention is to provide a reinforced base for support of a wind turbine tower that is capable to prevent bending at several heights of the central column.

This object is solved by a base according to claim 1. Advantageous advancements are subject-matter of the dependent claims.

The present invention refers to a base for support of a wind turbine tower. The base comprises a, preferably tubular, central column.

At a bottom of the central column a central column foundation is provided. By means of said central column foundation the central column can be fixed to the ground. Preferably the central column foundation is realized by a collar, yoke or flange.

At a top of the central column, opposed to the bottom, a wind turbine is attached. The wind turbine is attached to the top of the column, in a manner that a rotation axis of the turbine is fixed with respect to the base or that the rotation axis of the turbine is movable, especially rotatable with respect to the base.

Between its bottom and its top the central column is provided with a bearing portion for pliable inclined upper tensile structural elements, which is hereinafter called the tensile structure element bearing portion. The pliable inclined upper tensile structural elements are preferably formed of tubular cylindrical bars with preferably circular profile. Upper ends, i.e. those ends that are farther away from the ground, of the upper tensile structural elements are attached to the tensile structure element bearing portion of the central column. "Pliable" means in this context that the flexural stiffness is very small in comparison to its extensional stiffness. "Inclined" means that the tensile structural elements extend in a direction nonparallel to the direction of the longitudinal extent or the axis of the central column. The upper ends of the upper tensile structural elements are preferably attached to the central column by means of hinged joints. In case the upper tensile structural elements are tubes or bars, hinge connection or anchor plates with hexagonal nuts instead of ball joints may be used. The tensile structure element bearing portion may be an element attached to the center column or may be integrally formed with the center column.

Around the central column foundation, further, preferably smaller, foundations for tensile structural elements, hereinafter called tensile structural element foundations, are provided. By means of said tensile structural element foundations tensile structural elements, like wires, wire ropes or other pliable elements, may be fixed to the soil independently from the central column foundation. The tensile structural element foundations may be realized by tent-peg-like elements. Other anchoring devices are also in the scope of the present invention.

The base according to the present invention is generally characterized by, preferably horizontally extending, flexurally rigid compressive structural elements as well as, preferably vertically extending, pliable lower tensile structural elements.

"Flexurally rigid" means in this context that the compressive structural elements are capable to withstand or transmit compressive forces in opposite to the upper and lower tensile structural elements, which are not capable to withstand or transmit compressive forces or which are just capable to withstand or transmit very small compressive forces.

The compressive structural elements are arranged within the base in such a manner that each lower end of the upper tensile structural elements, i.e. the end that is closer to the soil, is attached to a respective rigid compressive structural element. This compressive structural element connects said lower end of the upper tensile structural element with a compressive structural element bearing portion of the central column. The compressive structural element bearing portion is located between the tensile structure element bearing portion and the central column foundation. The compressive structure element bearing portion may be an element attached to the center column or a may be integrally formed with the center column.

The lower tensile structural elements are arranged within the base in such a manner that each lower end of the upper tensile structural elements is attached to a respective lower tensile structural element. This lower tensile structural element connects said lower end of the respective upper tensile structural element with one of the tensile structural element foundations.

Like the upper tensile structural elements also the lower tensile elements are preferably tubular circular cylindrical bars. Embodiments with wires or wire ropes are also within the scope of the present invention.

The connections of the tensile structural element foundations with the lower tensile structural elements, of the lower tensile structural elements with the upper tensile structural elements and of the compressive structural elements with the upper and lower tensile structural elements, respectively, are preferably realized by hinged connections. In case the upper and lower tensile structural elements are tubes or bars, hinge connection or anchor plates with hexagonal nuts instead of ball joints may be used.

By providing the compressive structural elements it is possible to support the central column at a further height besides the height of the tensile structure element bearing portion.

Furthermore, it is possible to arrange the direction of the bearing forces at the tensile structural element foundations without changing the position of the tensile structural element foundations by determining the length of the compressive structural elements as desired. Therefore, it is possible to adapt the directions of the bearing forces at the tensile structural element foundations according to the respective soil conditions.

In this context it may be stated that preferably the lower tensile structural elements have all the same length, that preferably all upper tensile structural elements have the same length and that preferably all compressive structural elements have the same length. However, it is also within the scope of the invention to provide the base with tensile and compressive structural elements with respective different lengths.

According to another aspect of the invention the base comprises at least three upper tensile structural elements, three lower tensile structural elements, three compressive structural elements and three tensile structural element foundations.

In case the three upper tensile structural elements are arranged in such a manner that none of the three upper tensile structural elements lies in the same imaginary plain as one of the other upper tensile structural elements, the three lower tensile structural elements are arranged in such a manner that none of the three lower tensile structural elements lies in the same imaginary plain as one of the other lower tensile structural elements and the three compressive structural elements are arranged in such a manner that none of the three compressive structural elements lies in the same imaginary plain as one of the other compressive structural elements, the central column may be reinforced in every lateral direction parallel to the soil.

According to another aspect of the invention each lower end of the upper tensile structural elements is connected to respective lower ends of neighboring upper tensile structural elements via respective outer lateral structural elements in such a manner that all outer lateral structural elements form an outer annulus around the central column.

When a wind turbine tower with the foundation base according to the invention is exposed to a lateral wind load, the central column may be bent and the tensile structural elements as well as the compressive structural elements may deviate in lateral direction. By providing the outer lateral structural elements, the said lateral deviation is minimized. With the outer lateral structural elements forming an annular structure, the lateral structural elements are either realized as elements essentially just capable to bear compressive forces or as elements essentially just capable to bear tensile forces. Therefore, a good structural integrity at comparably low cost is achieved.

There are another relevant aspects of the invention, as described in the items below:
  (i) Central portions of the compressive structural elements are connected with each other via inner lateral structural elements, in such a manner that all inner lateral structural elements form an inner annulus around the central column.
    These inner lateral structural elements may prevent buckling of the compressive structural elements during lateral wind loads on the base which further improves the structural integrity of a base according to the invention.
  (ii) The inner lateral structural elements and the outer lateral structural elements are indirectly pretensioned elements and the outer lateral structural elements are capable to bear compressive forces.

(iii) The upper tensile structural elements and/or lower tensile structural elements are pretensioned pliable elements.

When the upper and/or lower tensile structural elements are pretensioned pliable elements, a wind load induced bending of the central column initially causes mainly a change of the pretension in the upper and/or lower tensile structural elements and just marginal deformations of said elements.

(iv) At least one of the pliable elements comprises a tensioner for inducing and adapting a pretension within the pliable element.

The tensioner makes it possible to keep the respective pliable element and parts of the structure adjacent to said element pretensioned during larger deformations of the base. Furthermore, the eigenmode of the wind turbine tower can be changed to prevent the stimulation of wind load induced oscillating of the wind turbine tower. In a further improved embodiment, the tensioner may also have features to influence the damping behavior of the respective element.

(v) The tensile structure element bearing portion and/or the compressive structural element bearing portion of the central column is realized by a ring that is attached to the rest of the central column.

With the tensile structure element bearing portion and/or the compressive structural element bearing portion being a ring attachable to the rest of the central portion every common wind turbine tower according to the state of the art can be modified so as to be supported by a base according to the present invention.

(vi) The compressive structural elements are hinged connected to the compressive structural element bearing portion.

A hinged connection between the compressive structural elements and the compressive element bearing portion may facilitate the aspects of the execution and assembly of the structure.

(vii) The base comprises more than just one tensile structural element bearing portion and correspondingly more than just one set of upper tensile structural elements and lower tensile structural elements, respectively, as well as more than just one compressive structural element bearing portion and correspondingly more than just one set of compressive structural elements.

Hence, the center column may be supported in more than just two key heights making it possible to adapt the reinforcement structure to the expected oscillating behavior of the unreinforced center column more specifically.

The present invention refers to a wind turbine tower comprising a foundation base according to one or more of the above aspects.

Finally, it is relevant to consider that an upper part of the wind turbine tower is a standardized module or consists of standardized modules. When a wind turbine is built by putting together the foundation base and the lower section of the tower according to the present invention and a standardized top of a wind turbine tower, the base basically just replaces a disadvantageous base according to the current state of the art. Hence, the advantages of the present invention can be gained without be forced to change the whole system, but only the lower section of the tower and the foundation base, which are optimized, keeping the upper part unchanged.

BRIEF DESCRIPTION OF THE DRAWINGS

The invention will be better understood based upon the disclosure of the appended drawings where.

DETAILED DESCRIPTION OF THE DRAWINGS

Figure 1:
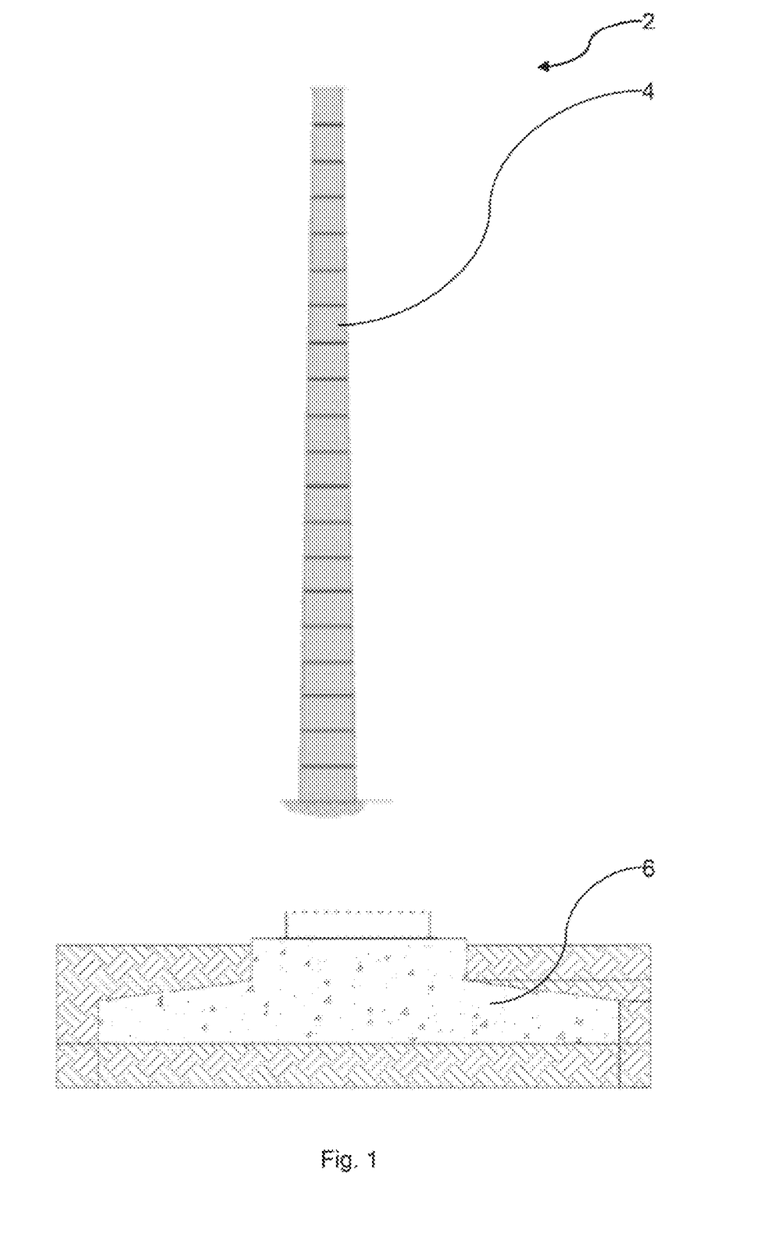
FIG. 1 illustrates a side view of the state of the art, with a metal tubular wind turbine tower composed of smaller segments and its foundation in concrete for supporting the horizontal axis wind turbine.

FIG. 1 depicts a central column 2 of a metal tubular wind turbine tower 1 of the current state of the art (cf. FIG. 3A), which comprises smaller steel sections 4, totaling a weight of approximately 125 tons for 80 meters towers with wind turbines with nominal power of around 1.5 megawatts. A circular foundation 6 of the central column 2 in the example, is made of a concrete block with a volume of about 280 cubic meters.

Figure 2:
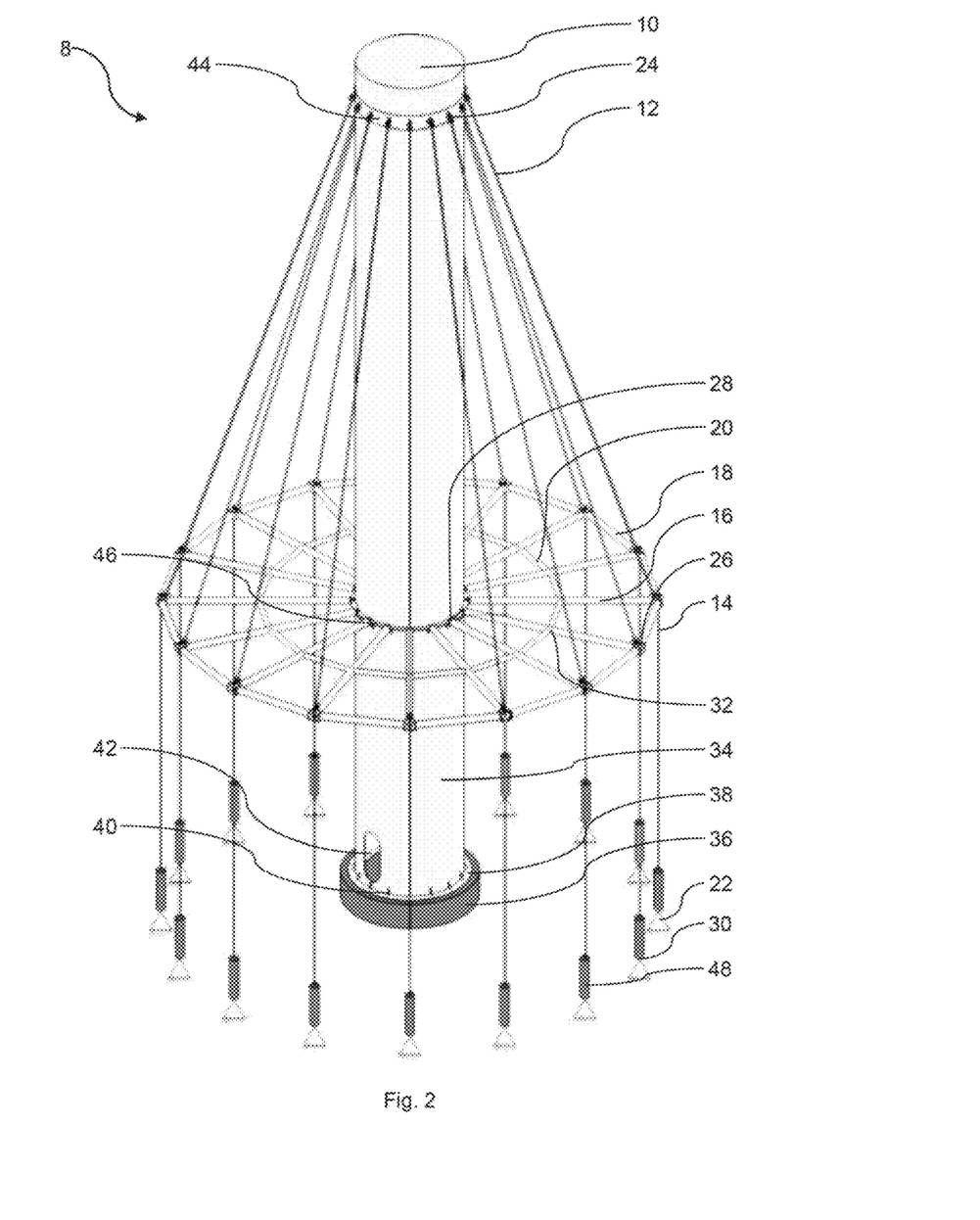
FIG. 2 illustrates a variation of a tower according to the present invention.

FIG. 2 shows a base 8 according to the present invention. The base 8 essentially consists of a conical central column 10, sixteen upper tensile structural elements 12, sixteen lower tensile structural elements 14, sixteen compressive structural elements 16, sixteen outer lateral structural elements 18, sixteen inner lateral structural elements 20, sixteen tensile structural element foundations 22, sixteen upper tensile structural element to central column joints 24, sixteen structural element joints 26, sixteen compressive structural element to column joints 28, sixteen lower tensile structural element to foundation joints 30 and thirty-two compressive structural element to inner lateral structural element joints 32.

The central column 10 is basically a conical metal tube 34 which is affixed to a concrete central column foundation 36. At the lower edge of the tube 34, where the cross section of the tube 34 is bigger than at the upper edge, a flange 38 is provided. Ribs 40 at said lower edge reinforce the transition between the tube 34 and the flange 38. An opening 42 above the flange 38 ensures the access to the interior of the tube 34, especially for installation reasons.

The central column foundation 36 is similar to the state of the art central column foundation 6 depicted in FIG. 1, i.e. the central column foundation 36 is a flange with a circular cross section. However, the radial dimensions of the central column foundation 36 are smaller than the radial dimensions of the state of the art central column foundation 6.

The metal tube 34 is connected to the central column foundation 36 by means of non-depicted screws.

Alternatively to the present embodiment it is also possible to use a tube out of a different material instead of the metal. Especially carbon or glass composites may be advantageous. The tube 34 may not be conical but circularly cylindrical. It may also be possible to realize the tube 34 and the central column foundation 36 by a single element consisting of the same material, e.g. metal or concrete.

At a portion close to the upper edge of the tube 34 a tensile structural element bearing portion 44 is provided at the tube 34. The tensile structural element bearing portion 44 is a metal ring welded to the outer surface of the tube 34 which comprises sixteen ports for the upper tensile structural element to central column joints 24. Said sixteen ports are all located at the same height and are evenly distributed around the outer circumference of the metal ring.

At a portion between the tensile structural element bearing portion 44 and the central column foundation 36 a compressive structural element bearing portion 46 is provided. Like the tensile structural element bearing portion 44 the compressive structural element bearing portion 46 is a metal ring welded to the outer surface of the tube 34. The compressive structural element bearing portion 46 comprises sixteen ports for the compressive structural element to column joints 28. Said sixteen ports are all located at the same height and are evenly distributed around the outer circumference of the metal ring. The distance between the compressive structural element bearing portion 46 and the tensile structural element bearing portion 44 is about twice as big as the distance between the compressive structural element bearing portion 46 and the central column foundation 36.

The tensile structural element bearing portion 44 and the compressive structural element bearing portion 46 may alternatively be integrally formed with the tube 34.

The upper tensile structural elements 12 are attached to the tube 34 by means of the upper tensile structural element to central column joints 24. The upper tensile structural element to central column joints 24 are realized by hinged connections.

The compressive structural elements 16 are attached to the tube 34 by means of the compressive structural element to central column joints 28. The compressive structural element to central column joints 28 are hinged connections, i.e. they are capable to transfer translation in each and every direction. The compressive structural elements 16 protrude from the tube 34 in a direction perpendicular to a longitudinal direction the tube 34. In other words, the compressive structural elements 16 extend radially outwards from the tube 34 parallel to the surface of the ground surrounding the central column foundation 36, provided that this surface is flat.

The upper tensile structural elements 12 extend inclined downwards towards the outer ends of the compressive structural elements 16. Therefore, each upper tensile structural element 12 forms together with the respective compressive structural element 16 and the portion of the tube 34 between the tensile structural element bearing portion 44 and the compressive structural element bearing portion 46 a rectangular triangle. In other words, the upper tensile structural elements 12 and the compressive structural elements 16 contour an imaginary truncated cone with the upper tensile structural elements 12 lying in the lateral surface and the compressive structural elements 16 lying in the bottom surface area of the imaginary truncated cone.

Each of the structural element joints 26 connects one of the lower ends of the upper tensile structure elements 12 with the outer end of the respective compressive structural element 16 and with the upper end of the respective lower tensile structure element 14.

Each of the outer lateral structural elements 18 connects two neighboring structural element joints 26 so that all outer lateral structural elements 18 form an annulus around the central column 10. Said annulus essentially contours the bottom surface area of above mentioned imaginary truncated cone.

Each of the inner lateral structural elements 20 connects medium portions of two neighboring compressive structural elements 16 so that all inner lateral structural elements 20 form an annulus around the central column 10. Said annulus is concentrical to the annulus of the outer lateral structural elements 18 and lies in the bottom surface area of above mentioned imaginary truncated cone. Both ends of each inner lateral structural element 20 are attached to the respective medium portions of the compressive structural element 16 via the compressive structural element to inner lateral structural element joints 32.

The compressive structural element to inner lateral structural element joints 32 are rigid connections, i.e. they are capable to transfer rotations and translation in each and every direction.

The structural element joints 26 are rigidly connected to the respective compressive structural elements 16. Regarding the respective upper tensile structure element 12 and the respective lower tensile structure element 14 each structural element joint 26 acts like a hinged joint, i.e. at least in one direction rotation can neither be transferred from one of the upper tensile structural elements 12 to the respective compressive structural element 16 nor from one of the lower tensile structural elements 14 to the respective compressive structural element 12.

The lower tensile structural elements 14 extend straight downwards from the structural element joints 26 towards the tensile structural element foundations 22. In other words, the lower tensile structural elements 14 are parallel to the longitudinal axis of the tube 34.

Each lower end of the tensile structural elements 14 is connected to the respective tensile structural element foundation 22 by means of one of the lower tensile structural element to foundation joints 30. Said lower tensile structural element to foundation joints 30 are hinged connections. Each lower tensile structural element comprises a tensioner 48. By means of the tensioners 48 the whole system of the upper and the lower tensile structural elements 12 and 14 as well as the compressive structural elements 16 can be pretensioned in order to enhance the stiffness of the base 8. In order to prevent stimulating of the oscillation of the base 8 and a whole wind turbine tower 50 (cf. FIG. 3B) with the base 8, respectively, it may be advantageous to induce different pretensions in the different lower tensile structural elements 14.

Each tensile structural element foundation 22 is basically a small version of the central column foundation 36, i.e. a disk-shaped element which is buried in the ground, except that its length is much larger than the cross section and the element be subjected to tensile.

All upper and lower tensile structural elements 12 and 14 are realized by hollow metal tubes with circular ring-shaped cross sections or massive metal bars with circular cross sections. All compressive structural elements 16 as well as all outer and inner lateral structural elements 18 and 20 are realized by hollow metal tubes with circular ring-shaped cross sections.

Figure 3A:
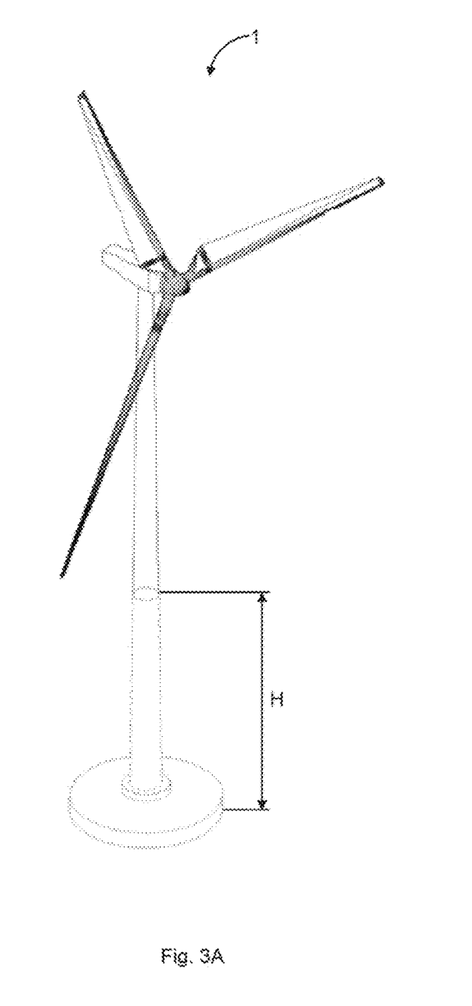
FIG. 3A is a contrasting juxtaposition of a state of the art wind turbine tower and FIG. 3B is a wind turbine tower according to the present invention.
Figure 3B:
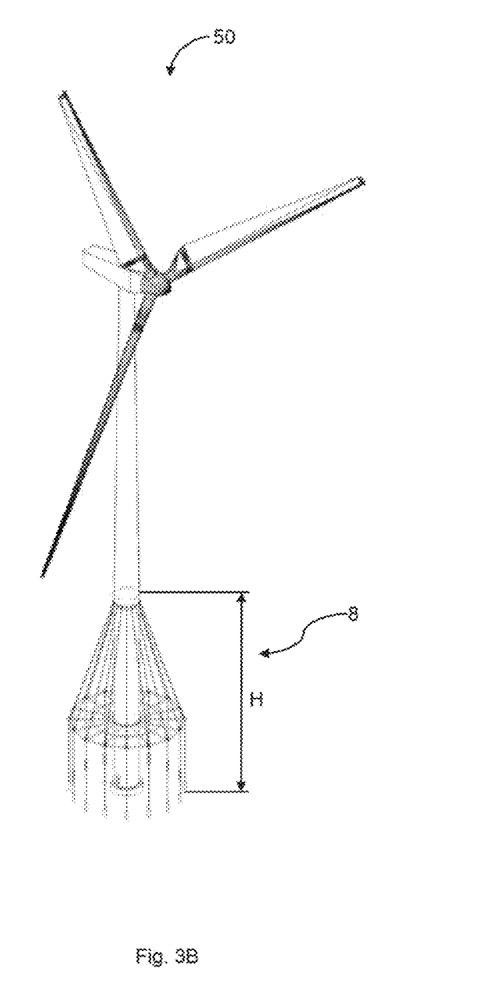

FIG. 3A illustrates a wind turbine tower according to the state of the art and FIG. 3B illustrates the wind turbine tower 50 comprising the base 8 according to the invention.

Both the wind turbine tower according to the state of the art and the wind turbine tower according to the present invention comprise a wind turbine at each top and a central structure extending from the wind turbine downwards to the ground. Until a certain height H said central structures can be completely identical. For example, they can consist of standardized modules, especially ring-shaped steel section 4

LIST OF REFERENCE NUMBERS 1 state of the art wind turbine tower
2 state of the art central column
4 state of the art steel section
6 state of the art central column foundation
8 base
10 central column
12 upper tensile structural element
14 lower tensile structural element
16 compressive structural element
18 outer lateral structural element
20 inner lateral structural element
22 tensile structural element foundation
24 upper tensile structural element to central column joint
26 structural element joint
28 compressive structural element to central column joint
30 lower tensile structural element to foundation joint
32 compressive structural element to inner lateral structural element joint
34 tube
36 central column foundation
38 flange
40 rib
42 opening
44 tensile structural element bearing portion
46 compressive structural element bearing portion
48 tensioner
50 wind turbine tower with a base
H height of a wind turbine tower

The invention claimed is:

1. A base (8) for support of a wind turbine tower (50) comprising:
a central column (10), with a central column foundation (36) for fixing the central column (10) to the ground or a support platform,
pliable inclined upper tensile structural elements (12) with upper ends attached to a tensile structure element bearing portion (44) of the central column (10) above the central column foundation (36), and
tensile structural element foundations (22) around the central column foundation (10), which provide a fixation to the ground independently from the central column foundation (36),
characterized in that
a lower end of each of the upper tensile structural elements (12) is attached to a respective flexurally rigid compressive structural element (16) that connects said lower end of the respective upper tensile structural element (12) with a compressive structural element bearing portion (46) of the central column (10), which is located between the tensile structure element bearing portion (44) and the central column foundation (36), and
each lower end of the upper tensile structural elements (12) is attached to a respective pliable lower tensile structural element (14) that connects said lower end of the respective upper tensile structural element (12) with one of the tensile structural element foundations (22).

2. The base (8) according to claim 1, by which comprises at least three of the upper tensile structural elements (12), three of the lower tensile structural elements (14), three of the compressive structural elements (16) and three of the tensile structural element foundations (22) being equally spaced apart from each other.

3. The base (8) according to claim 2, characterized in that each lower end of the upper tensile structural elements (12) is connected to respective lower ends of neighbouring upper tensile structural elements (12) via respective outer lateral structural elements (18) in such a manner that all outer lateral structural elements (18) form an outer annulus around the central column (10).

4. The base (8) according to claim 2, characterized in that central portions of the compressive structural elements (16) are connected with each other via inner lateral structural elements (20) in such a manner that all of the inner lateral structural elements (20) form an inner annulus around the central column (10).

5. The base (8) according to claim 4, characterized in that
the inner lateral structural elements (20) are indirectly pretensioned pliable elements and the outer lateral structural elements (18) are capable to bear compressive forces, or
the outer lateral structural elements (18) are indirectly pretensioned pliable elements and the inner lateral structural elements (20) are capable to bear compressive forces.

6. The base (8) according to claim 3, characterized in that at least one of the pliable elements (12; 14) comprises a tensioner (48) for inducing and adapting a pretension within the at least one pliable element (12; 14).

7. The base (8) according to claim 1, characterized in that the upper tensile structural elements (12) and/or lower tensile structural elements (14) are pretensioned pliable elements.

8. The base (8) according to claim 1, characterized in that the tensile structure element bearing portion (44) and/or the compressive structural element bearing portion (46) of the central column (10) is realized by a ring that is attached to the central column (10).

9. The base (8) according to claim 1, characterized in that the compressive structural elements (16) are hinged connected to the compressive structural element bearing portion (46).

10. A wind turbine tower (50) comprising a wind turbine disposed on a base (8) according to claim 1.

11. The wind turbine tower (50) according to claim 10, characterized in that the base (8) comprises at least three of the upper tensile structural elements (12), three of the lower tensile structural elements (14), three of the compressive structural elements (16) and three of the tensile structural element foundations (22) being equally spaced apart from each other.

12. The wind turbine tower (50) according to claim 10, characterized in that each lower end of the upper tensile structural elements (12) is connected to respective lower ends of neighbouring upper tensile structural elements (12) via respective outer lateral structural elements (18) in such a manner that all outer lateral structural elements (18) form an outer annulus around the central column (10).

13. The wind turbine tower (50) according to claim 12, characterized in that central portions of the compressive structural elements (16) are connected with each other via inner lateral structural elements (20) in such a manner that all of the inner lateral structural elements (20) form an inner annulus around the central column (10).

14. The wind turbine tower (50) according to claim 13, characterized in that the inner lateral structural elements (20) are indirectly pretensioned pliable elements and the outer lateral structural elements (18) are capable to bear compressive forces, or the outer lateral structural elements (18) are indirectly pretensioned pliable elements and the inner lateral structural elements (20) are capable to bear compressive forces.

15. The wind turbine tower (50) according to claim 12, characterized in that at least one of the pliable elements (12; 14) comprises a tensioner (48) for inducing and adapting a pretension within the at least one pliable element (12; 14).

16. The wind turbine tower (50) according to claim 10, characterized in that the upper tensile structural elements (12) and/or lower tensile structural elements (14) are pretensioned pliable elements.

17. The wind turbine tower (50) according to claim 10, characterized in that the tensile structure element bearing portion (44) and/or the compressive structural element bearing portion (46) of the central column (10) is realized by a ring that is attached to the central column (10).

18. The wind turbine tower (50) according to claim 10, characterized in that the compressive structural elements (16) are hinged connected to the compressive structural element bearing portion (46).

19. A base (8) for support of a wind turbine tower (50) comprising:

a tubular central column (10), with a central column foundation (36) for fixing the central column (10) to the ground or a support platform, pliable inclined upper tensile structural elements (12), formed of tubular cylindrical bars, with upper ends attached to a tensile structure element bearing portion (44) of the central column (10) above the central column foundation (36), and tensile structural element foundations (22) around the central column foundation (10), which provide a fixation to the ground independently from the central column foundation (36), characterized in that a lower end of each of the upper tensile structural elements (12) is attached to a respective, horizontally extending, flexurally rigid compressive structural element (16) that connects said lower end of the respective upper tensile structural element (12) with a compressive structural element bearing portion (46) of the central column (10), which is located between the tensile structure element bearing portion (44) and the central column foundation (36), and each lower end of the upper tensile structural elements (12) is attached to a respective, vertically extending, pliable lower tensile structural element (14) that connects said lower end of the respective upper tensile structural element (12) with one of the tensile structural element foundations (22).

* * * * *